(12) United States Patent
Cordery (10) Patent No.: US 6,711,680 B1
(45) Date of Patent: Mar. 23, 2004

(54) METHOD OF LIMITING KEY USAGE IN A POSTAGE METERING SYSTEM THAT PRODUCES CRYPTOGRAPHICALLY SECURED INDICIUM

(75) Inventor: Robert A Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/456,695

(22) Filed: Dec. 9, 1999

(51) Int. Cl.$^7$ ................................................. H04L 9/00
(52) U.S. Cl. ...................... 713/176; 713/156; 713/168; 713/178; 713/180; 713/181; 380/21; 380/42; 380/28; 380/30; 380/51; 380/284; 705/40; 705/1
(58) Field of Search ................................. 713/156, 168, 713/176, 178, 180, 181; 380/42, 43, 28, 46, 30, 51, 55, 278, 285, 284, 277, 21, 23; 705/40, 59, 55, 60, 67, 404, 408, 410

(56) References Cited

U.S. PATENT DOCUMENTS

| | | | | |
|---|---|---|---|---|
| 5,293,319 | A | * | 3/1994 | DeSha et al. |
| 5,970,150 | A | * | 10/1999 | Sansone |
| 6,014,445 | A | * | 1/2000 | Kohda et al. |
| 6,085,182 | A | * | 7/2000 | Cordery |
| 6,175,827 | B1 | * | 1/2001 | Cordery et al. |
| 6,266,771 | B1 | * | 7/2001 | Bellare |

FOREIGN PATENT DOCUMENTS

| | | |
|---|---|---|
| EP | 0360225 A2 | 3/1990 |
| EP | 0735721 A2 | 10/1996 |
| EP | 0743774 A2 | 11/1996 |

* cited by examiner

Primary Examiner—Ly V. Hua
(74) Attorney, Agent, or Firm—Brian A. Lemm; Angelo N. Chaclas (57) ABSTRACT

A method and system for generating messages from which it can be verified that a variable does not exceed a predetermined limit. The message can be a postal indicium. A message originator, which can be a postage metering system, receives a message in the form $R^{-k}(T)$, where R is a trapdoor function, K is an integer equal to the limit, and T is a plain text, from a data processing center which maintains the inverse function $R^{-1}$ in secrecy. The message originator computes $S_m = R^m(R^{-k}(T))$, where m is a current value of the variable, and incorporates $S_m$ into the message. A verifier verifies that m<K by confirming that $R^{k-m}(S_m) = T$. The verifier cannot compute $R^{k-m}(S_m)$ for m<K since it does not have $R^{-1}$. For the same reason the originator cannot compute $R^{-k'}(T)$, k'>K, from $R^{-k}(T)$.

34 Claims, 7 Drawing Sheets

METHOD OF LIMITING KEY USAGE IN A POSTAGE METERING SYSTEM THAT PRODUCES CRYPTOGRAPHICALLY SECURED INDICIUM

RELATED APPLICATIONS

The present application shares common elements of disclosure with commonly assigned, U.S. application Ser. No. 09/220,657, titled: METHOD OF LIMITING KEY USAGE IN A POSTAGE METERING SYSTEM THAT PRODUCES CRYPTOGRAPHICALLY SECURED INDICIUM.

BACKGROUND OF THE INVENTION

The subject invention relates to a method whereby a message originator can generate a message including a verifiable assertion that a variable is within predetermined limits. More particularly it relates to cryptographic indicia, and still more particularly, to cryptographic indicia that require a change of cryptographic keys used therefor based on a non-time parameter of the cryptographic indicia.

There are many cases where a message originator can originate only a limited number or type of messages. A party may have the right to issue a limited number of tickets, identification documents, etc., either as printed documents or as digital messages. Similarly an agent may have authority to draw against a principle's account for amounts up to a predetermined limit, or have authority to act for a certain time period. Each such act by such a party is a message implicitly or explicitly asserting that a variable (e.g. a serial number, or amount, or date) is within predetermined limits. Clearly it would be highly desirable if another party receiving such a message could verify that those limits were not exceeded.

A particular example where such capability would be useful relates to cryptographic postal indicia. The United States Postal Service (USPS) is currently advocating the implementation of a new Information-Based Indicia Program (IBIP) in connection with the printing of postage indicia by postage metering systems. Under this new program, each postage indicium that is printed will include cryptographically secured information in a barcode format together with human readable information such as the postage amount and the date of submission to the post office. The cryptographically secured information is generated using public key cryptography and allows a verification authority (hereinafter sometimes "verifier"), such as the post office, to verify the authenticity of the printed postage indicium based on the information printed in the indicium and the printed destination address. Moreover, it has also been proposed to use secret key cryptography as an alternative to the public key system described above. In the secret key system verifiable cryptographically secured information is also included as part of the indicium.

Regardless of whether a public or secret key system is utilized, both systems use a key that is securely and secretly stored within the postage meter. This stored key is referred to as a private key in a public key system and a secret key in a secret key system. In either case, the stored key is used to cryptographically secure certain information contained within the printed postage indicium. However, since the security of either system is dependent upon maintaining the secrecy of the stored key, it is imperative that such stored key not be compromised.

One of the factors that increases the vulnerability of the stored key to attacks such as cryptoanalysis, differential fault analysis, and differential power analysis is the amount of its use. That is, the more the stored key is used to cryptographically secure data the more vulnerable it is to these attacks. In order to partially solve this problem, it has been suggested to require the postage meter to obtain a new secret key after a predetermined period of time has expired. The problem with this method is that it does not necessarily reflect the actual usage of the stored key in generating cryptographically secured indicia images. Thus, if a specific postage meter has extremely high usage, waiting for the predetermined period of time to expire before requiring the changing of the stored key may not be a satisfactory security solution.

One solution to this problem would be to incorporate a variable, e.g. piece count, which is a measure of meter usage into the postal indicia along with information which would allow a verifier to verify that the variable was within predetermined limits. Since the piece count is typically a part of the signed data in a postal indicium its accuracy is assured and verification that it lies within predetermined limits would provide an accurate indication of the need to change the meter key.

In other applications the variable forms an inherently required part of the message and is self verifying, e.g. the amount of a check, or can be directly determined by the verifier, e.g. a quantity of goods ordered from a supplier. Thus verifiable information that the amount was within the authority of an agent would prevent agents from writing checks or ordering quantities which exceeded their authority.

Accordingly, it is an object of the subject invention to provide a method and system wherein a message originator is enabled and authorized by a third party to generate a verifiable message asserting that a variable is within predetermined limits only if the variable is within those predetermined limits.

BRIEF SUMMARY OF THE INVENTION

The above object is achieved and the disadvantages of the prior are overcome in accordance with the subject invention by means of a system and method for generation of a message from which it can be verified that a variable is within predetermined upper and lower limits. In accordance with the invention a trapdoor function R is provided to a message originator and to a message verifier, and a third party maintains a corresponding inverse function $R^{-1}$ in secrecy an integer K equal to the difference between said upper limit and said lower limit is determined; and a second message including $R^{-k}(T)$ is provided from said third party to said message originator, wherein T is a plain text coded as an integer and $R^{-k}(T)$ represents K iterations of said inverse function $R^{-1}$ with said coded text T. The message originator generates a third message $S_x = R^x(R^{-k}(T))$; wherein $R^x(R^{-k}(T))$ represents x iterations of said function R with $R^{-k}(T)$; and wherein x is an integer equal to the absolute value of the difference between a current value of said variable and one of said limits; and incorporates at least said third message $S_x$ into said first message to assert that said current value of said variable is within said limits A verifier receiving said first message recovers $S_x$ and determines said current value of said variable and said other limit; and confirms that $R^y(S_m) = T$; wherein $R^y(S_m)$ represents y iterations of said function R with said third message $S_m$ and wherein y is an integer equal to the absolute value of the difference between said current value of said variable and said other limit.

In accordance with one aspect of the subject invention the first message is a postal indicium.

In accordance with another aspect of the subject invention the postal indicium is encrypted by a postage metering system using an encryption key and said second message is transmitted to said system when said key is changed.

In accordance with another aspect of the subject invention the plain text T includes an identification of said postage metering system.

In accordance with another aspect of the subject invention the plain text T further includes said other limit.

In accordance with another aspect of the subject invention the current value of said variable is provided to said verifier by incorporation in said first message.

In accordance with another aspect of the subject invention the current value of said variable is inherent in the meaning of said first message.

In accordance with another aspect of the subject invention the current value of said variable is determined directly by said verifier.

In accordance with another aspect of the subject invention the third message $S_x$ comprises said first message.

In accordance with another aspect of the subject invention the one limit is said lower limit.

In accordance with another aspect of the subject invention the one limit is said upper limit.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

In general the method of the subject invention is carried out by means of dedicated or specially programmed devices. In the preferred embodiment described below the message originator, or message originating system is a postage metering system which originates postal indicia, the verifier or verification system is a system operated by a postal service or similar organization, and the third party is a data center which is typically operated by a trusted third party such as a supplier of postage metering systems, or a special organization within a postal service.

Figure 1:
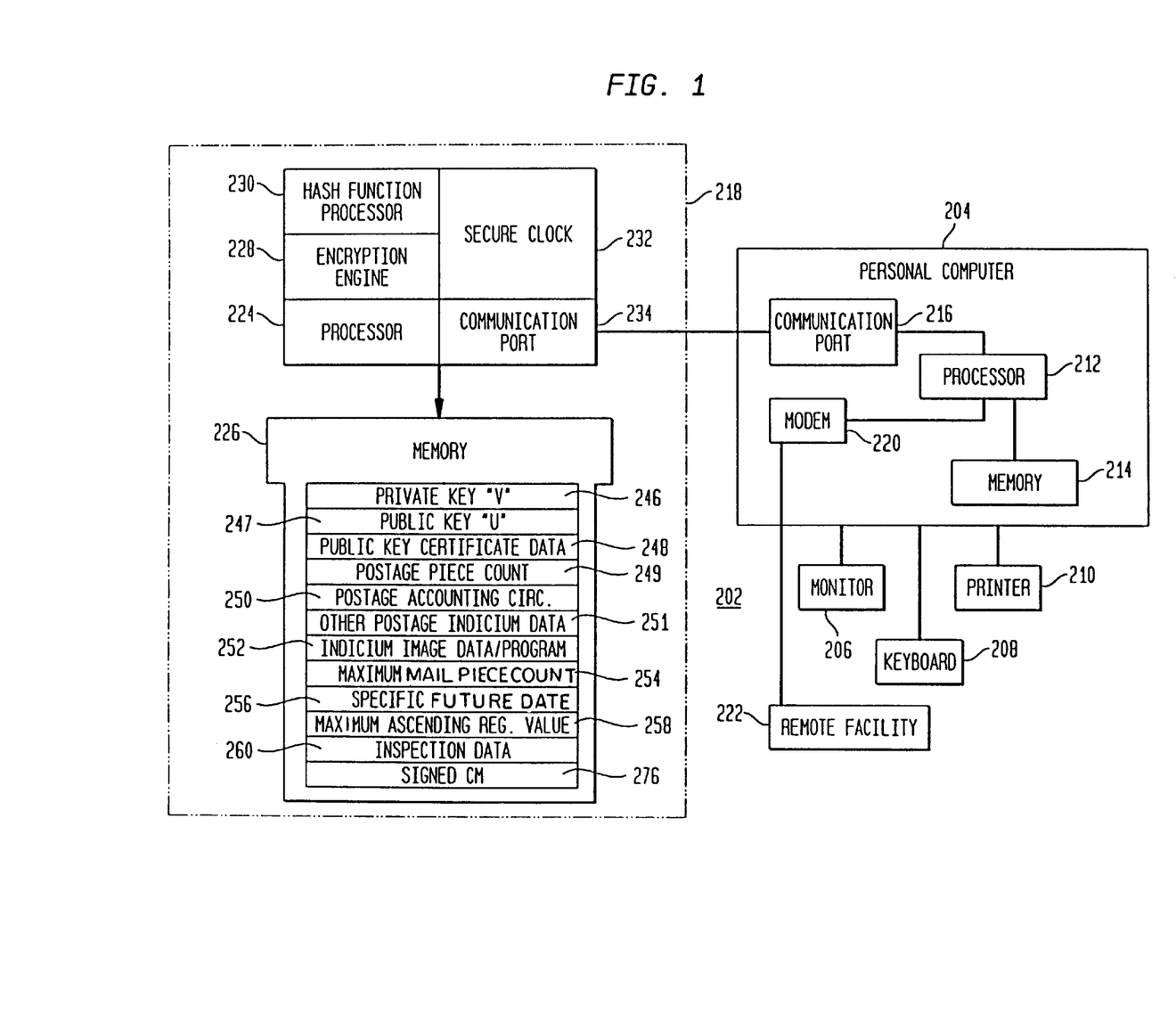
FIG. 1 is a schematic block diagram of a postage metering system capable of use with the method of the subject invention.

Referring to FIG. 1, a postage metering system, shown generally at 202, includes personal computer 204 connected to monitor 206, keyboard 208, and printer 210. Personal computer 204 additionally includes processing subsystem 212 having associated memory 214. Processing subsystem 212 is connected to communications port 216 for communication with secure postage meter accounting subsystem 218 and modem 220 for communicating with remote facility 222 which is not part of postage metering system 202. It should be recognized that many variations in the organization and structure of personal computer 204 as well as secure postage metering accounting subsystem 218 could be implemented. As an example, the communications from modem 220 to the remote facility can be by way of hardwire, radio frequency, or other communications including the Internet. Postage metering accounting subsystem 218 may take many forms such as, for example, a secure vault type system, or a secure smart card system.

Postage metering accounting subsystem 218 includes processor 224 coupled to memory 226. Processor 224 has associated with it an encryption engine 228, hash function processor 230, secure clock 232 and communications port 234. Memory 226 may have stored within it different data as well as the operating programs for the postage metering accounting subsystem 218. The data shown as stored in memory 226 includes private key 246 of a specified length (i.e. 512, 1024, to 4096 bits), corresponding public key 247, public key certificate data 248 (which could either be an actual public key certificate or a unique public key certificate identifier), an issued indicium piece count 249, conventional postage accounting ascending/descending register circuitry 250 which accounts for the amount of postage dispensed, other data 251 which may be included as part of the printed indicium (such as an algorithm identifier, customer identifier, and software identifier), indicium image data and associated programming 252 used to build the postage indicium image, maximum piece count 254, specific future date 256, and maximum ascending register value 258. Accounting circuitry 250 can be conventional accounting circuitry which has the added benefit of being capable of being recharged with additional prepaid postage funds via communication with a remote data center.

Figure 2:
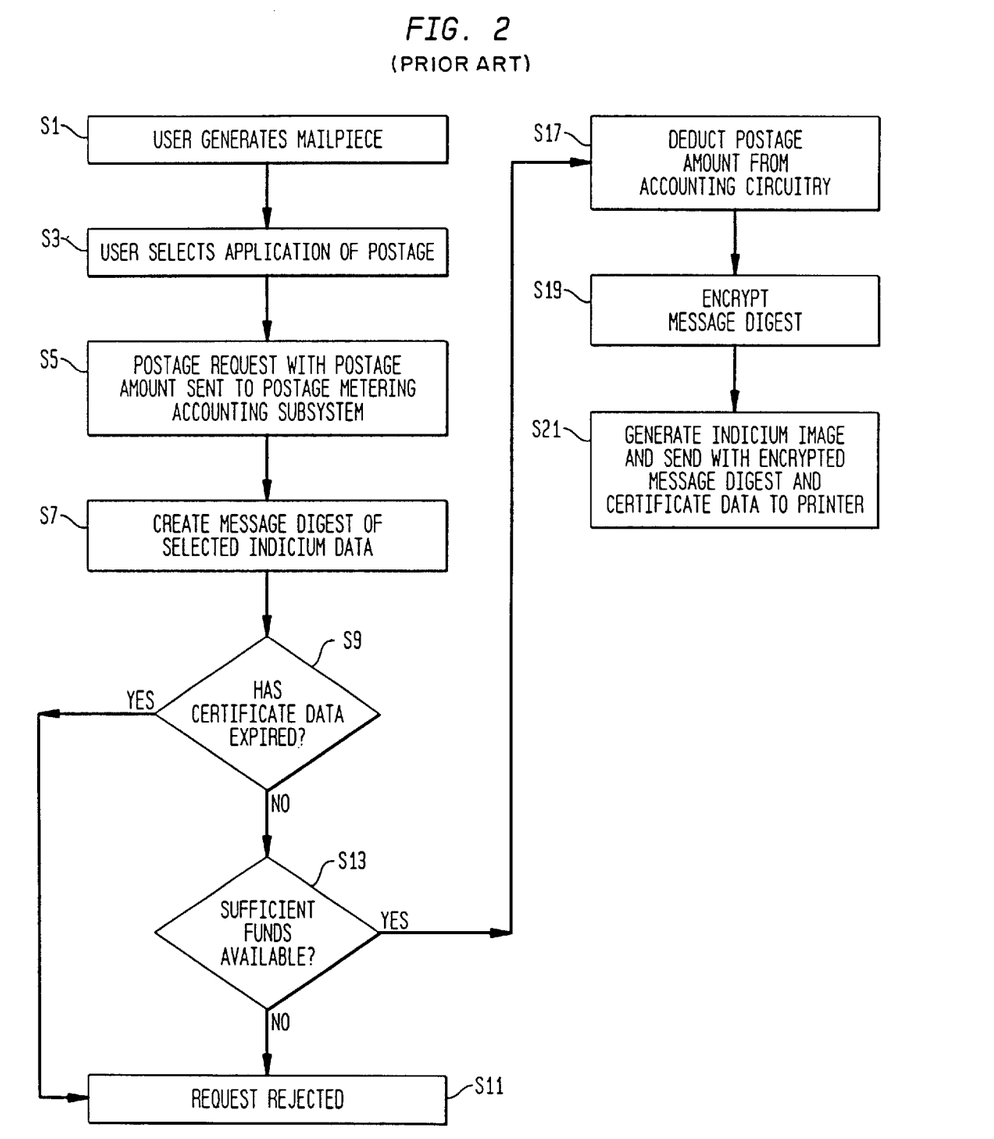
FIG. 2 is a flowchart showing a known method for the generation of a postage indicium within the postage metering system of FIG. 1.

Referring to FIG. 2, the operation of postage metering system 202 will be explained in connection with generating and printing a postage indicium. At step S1, a user generates a mailpiece utilizing an application program stored in memory 214. Upon completion of the mailpiece the user can elect to have postage applied thereto by clicking on an icon appearing on monitor 206 or alternatively pressing a special function key of keyboard 208 (step S3). In either case, once the postage application option has been elected, personal computer 204 sends such request together with the requested postage amount to postage metering accounting subsystem 218 via communication ports 216 and 234 (step S5). At step S7, hash function processor 230 generates a message digest of selected data to be included as part of the indicium. Postage metering accounting subsystem 218 then checks corresponding certificate data 252 to determine if it has expired (beyond validity date) (step S9). If the answer at step S9 is "YES", the request is rejected and the user notified of such rejection via monitor 206 at step S11. If the answer at step S9 is "NO", postage metering subsystem 218 determines if sufficient funds are available in accounting circuitry 250 to pay for the requested postage (step S13). If the answer at step S13 is "NO", the request is rejected and the user is notified of such rejection via monitor 206 (step S11). On the other hand, if the answer at step S13 is "YES", the amount of the postage to be dispensed is deducted within accounting circuitry 250 (step S17). At step S19 the message digest is then encrypted utilizing private key 246 and encryption engine 228 (which contains the encryption algorithm). The indicium image is then generated using the indicium image data and program 252 and the indicium image including the encrypted message digest and certificate data 252 are sent via computer 204 to printer 210 for printing on a mailpiece such as an envelope (step S21). The above description relative to the generation of the digitally signed postage indicium and operation of the postage metering system is known such that a further detailed discussion is not considered warranted.

Returning to FIG. 1, it is currently known to store an inspection date 260 within memory 226 of postage metering system 202. This inspection date 260 is used to ensure that postage metering system 202 communicates with data center 222 on a regular basis to accomplish a remote inspection of postage metering system 202 by remote data center 222. That is, if secured clock 232 shows a current date that is beyond stored inspection date 260, postage metering system 202 is programmed to inhibit the printing of a postage indicium until postage metering system 202 contacts data center 222 and successfully performs the required remote inspection. Upon successful completion of the remote inspection, data center 222 initiates storing of a new next inspection date in postage metering system 202 memory 226 thereby allowing continued operation of postage metering system 202 for printing indicium. The same concept utilizing specific future date 256 can be used to ensure that key pair 246 and 247 is periodically changed. That is, when secure clock 232 reaches specific future date 256, postage metering system 202 is required to contact data center 222 in older to initiate storing of new key pair 246, 247 in postage metering system 202. Until this contact is made, postage metering system 202 is incapable of producing a valid indicium with expired key pair 246, 247 and/or the postage metering system can be rendered incapable of printing an indicium.

The above described time dependent system in which the keys are required to be changed over time is deficient, as previously discussed, because it does not take into account the actual usage (number of times used) of private key 246 in cryptographically securing data. Thus, a high usage postage metering system 202 may be more susceptible to a cryptoanalysis attack than a low usage system over the same time period. The instant invention overcomes this problem by requiring a change of keys based upon a non-time parameter value such as one that is indicative of the amount of usage of stored cryptographic keys 246, 247 in generating cryptographically secured postage indicium. For example, stored maximum piece count 254 and/or maximum ascending register value 258 can be the parameter values used to require that new key pair 246, 247 be generated. Thus, when postage piece count 249 is the same as the maximum piece count 254, or maximum ascending register value 258 is the same as the ascending register value in accounting circuitry 250, postage metering system 202 requires itself to communicate with remote data center 222 to initiate, in a known manner, the generation and storage of new keys 246, 247 in memory 226. The programming in postage metering system 202 is such that until the communication with data center 222 and the generation and storage of new keys 246, 247 is successfully completed, the printing of a valid postage indicium by postage metering system 202 is not possible and/or postage metering system 202 is inhibited from printing a postage indicium. Additionally, as part of the new key generation communication with data center 222, data center 222 sends to postage metering system 202 a new maximum piece count 254 and a new maximum ascending register value 258 associated with newly stored key pair 246, 247 to permit continued printing of valid postal indicium by postage metering system 202.

In other embodiments described below key changes can also be based on time based variables in accordance with the subject invention.

The above discussed parameters of maximum piece count 254 and maximum ascending register value 258 are each directly related to the actual number of times that private key 246 is used to cryptographically secure a postage indicium. That is, in many postage metering systems, piece count 249 will correspond on a one for one basis with the use of public key 246. However, where postage metering system 202 processes batches of mail that have a single postage indicium associated therewith, a separate counter could be used to count the generation of each indicium. Therefor, instead of a stored maximum piece count 254, a maximum indicium count would be stored to determine when a new key pair is required. On the other hand, while the ascending register value does not correspond on a one for one basis with the actual usage of private key 246, it is indicative of the actual usage of private key 246. For example, if the smallest postage that is applicable to a piece of mail is considered to be 33 cents, the maximum assumed usage of postage metering system 202 would be the ascending register value divided by 33 cents. Thus, while this calculation does not represent the exact usage of private key 246 it can be used establish a maximum ascending register value 258 which is at least partially indicative of the actual usage of private key 246. Moreover, maximum ascending register value 258, in and of itself, represents a use of public key 246 relative to an amount of postage dispensed. It may be desirable for security purposes to simply limit the use of public key 246 because it has been used in conjunction with a predetermined amount of postage dispensed, regardless of the actual number of times public key 246 has been used to dispense such postage.

As discussed above, after the successful generation and storage of new keys 246, 247 in postage metering system 202 data center 222 downloads a new maximum piece count value 254 and/or a new maximum ascending register value 258 into postage metering system 202. The new values form the basis for when the next set of keys is required to be installed in the manner described above. The downloading and verification of these new values will now be described with reference to FIGS. 3, 4, 5A, B, and C, and 6A and B.

Initially data center 222 generates a "trapdoor" function R. As is well known a trapdoor function is a function whose inverse $R^{-1}$ is hard to compute from R and specific values R(T), R(T'), . . . ; but is relatively easily determined with certain data, i.e. a private key. Public key encryption algorithms are suitable trapdoor functions and the well known RSA function is preferred as allowing easy calculations of the forms $R^K(T)$ or $R^{-K}(T)$; representing K iterations of R or $R^{-1}$ with T respectively.

Figure 3:
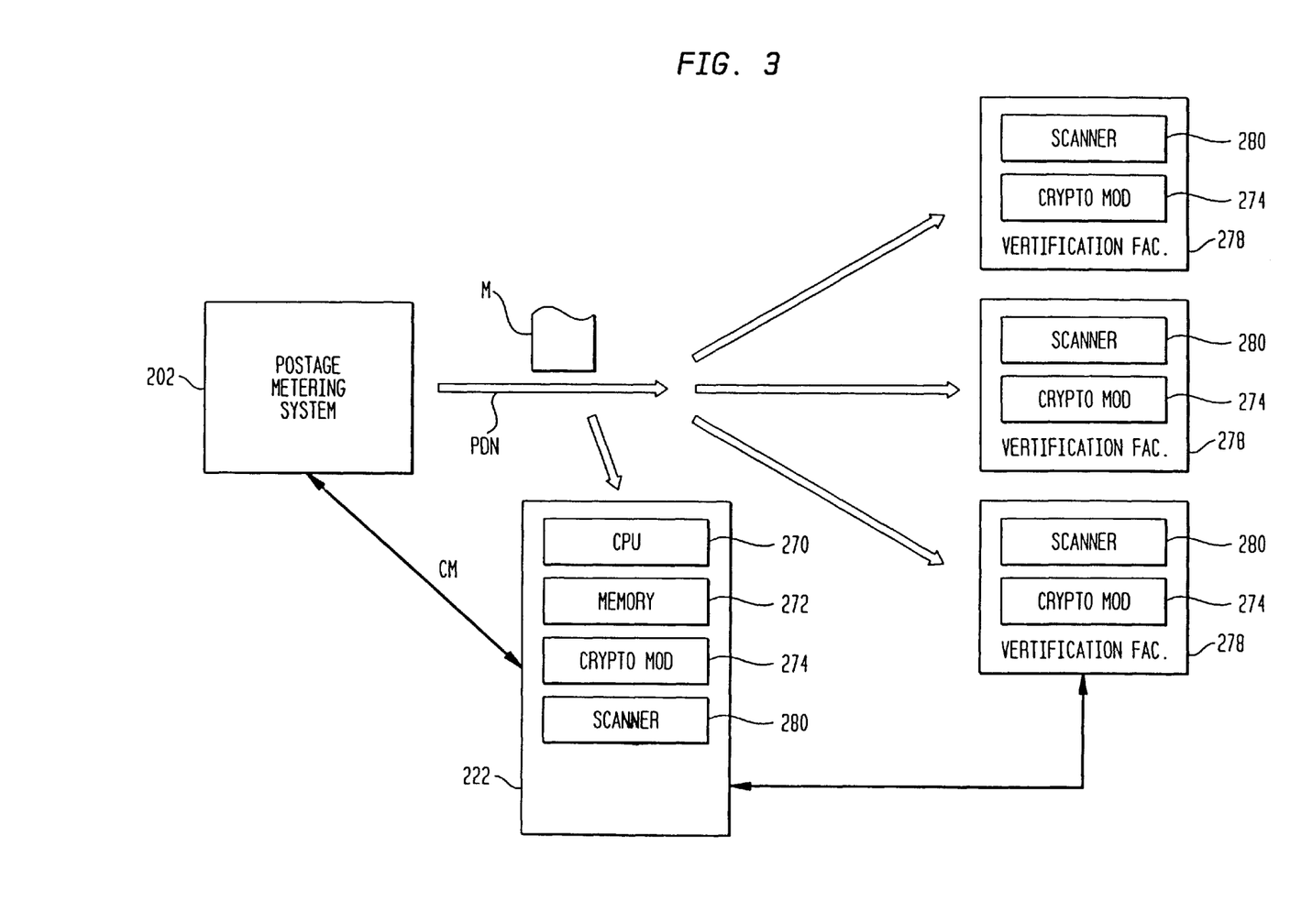
FIG. 3 is a schematic block diagram a system capable of use with the method of the subject invention; including a postage meter, a data processing center and verifying stations.
Figure 4:
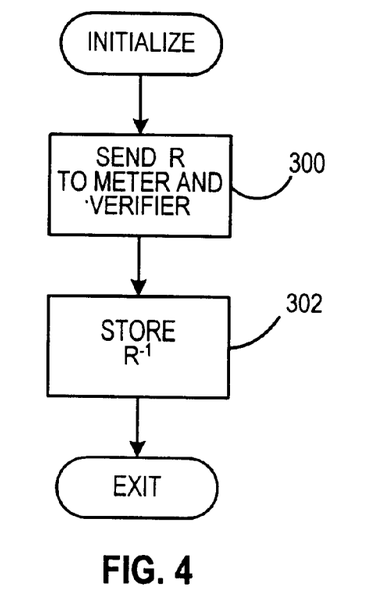
FIG. 4 is a flowchart showing initialization of the system of FIG. 3.

In FIG. 4 data center 222 initializes the system of FIG. 3, and at 300 sends function R to postage metering system 202 and verification facility 278. At 302 data center 222 securely stores $R^{-1}$ so that $R^{-1}$ is maintained in secrecy.

Figure 5A:
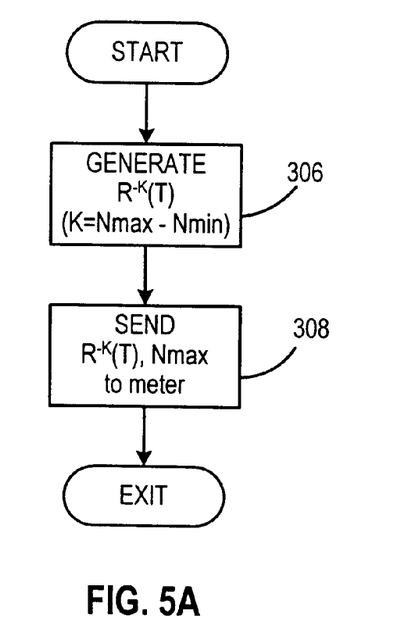
FIGS. 5A, B, and C are flow charts of the operation, in accordance with one embodiment of the subject invention, of a data processing center, a postage metering system and a verifying station, respectively.

FIG. 5A shows the operation of data center 222 in establishing a limit for a variable which is related to the amount of key usage (e.g. a number of mailpieces) when a new key is requested, or at any other time when a limit on operations must be renewed, such as after a meter inspection.

At 306 center 222 generates a second message $R^{-K}(T)$ where T is a plain text encoded as an integer, K is an integer representing the difference between the predetermined upper and lower limits Nmax and Nmin, which limits can be determined in any convenient manner, and $R^{-K}(T)$ represents K iterations of inverse function $R^{-1}$ with T. In general the content of T is not critical since, as will be described further below, recovery of any intelligible message will verify the assertion that the current value of the variable is within limits Nmax and Nmin. In the preferred embodiment shown, T="meter #, Nmax, Nmin", where "meter #" identifies metering system 202.

At 308 center 222 sends "$R^{-K}(T)$, Nmax" to metering system 202.

(In the embodiment shown successive ranges of limits are contiguous and Nmin is the previous Nmax or (initially) 0 and need not be sent to the message originator. In other embodiments both the upper and lower limits are sent to the message originator each time the limits are changed. In other embodiments Nmin is a constant, typically 0.)

Figure 5B:
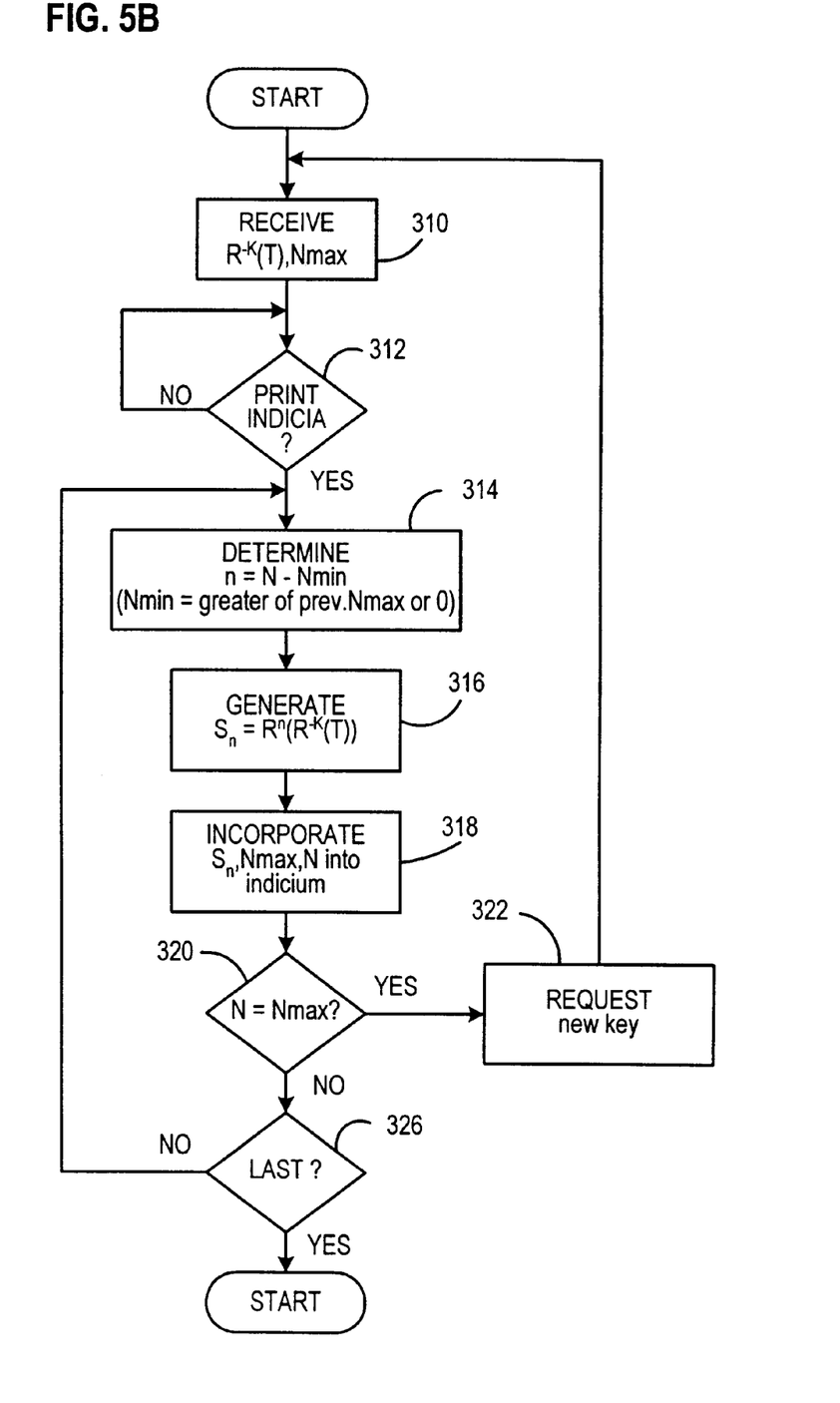

Turning to FIG. 5B, at 310 postage metering system 202 receives $r^{-K}(T)$, and at 312 waits until indicia are to be printed. When indicia are to be printed metering system 202 determines n, the difference between the current value of the limited variable N and Nmin, at 314.

In the embodiment shown variable N is the number of mailpieces.

In other embodiments:

Nmax=maximum ascending register value

N=current ascending register value

Nmin=previous ascending register value; or

Nmax=maximum number of days since inspection

N=current date

Nmin=date of last inspection.

Still other embodiments, relating to postal indicia or other types of messages, will be apparent to those skilled in the art and are within the contemplation of the subject invention.

At 314 system 202 determines n and, at 316, generates a third message $S_n=R^n(R^{-K}(T))$, and at 318 incorporates $S_n$, Nmax into the current indicium to be printed. If N, or information from which N can be determined, is not otherwise incorporated into the indicia it can also be incorporated at 318.

In other embodiments (e.g. N is a quantity of goods to be delivered by the verifier) the verifier can determine N directly.

At 320 metering system 202 determines if N=Nmax, i.e. if the predetermined limit has been reached, and, if so, at 322, requests a new key as described above and returns to 310. If the limit has not been reached, at 326 system 202 determines if there are further indicia to be printed, and if so returns to 314, and otherwise exits.

Those skilled in the art will recognize that other operations relating to the generation of postal indicia are carried on by postage metering system 202 concurrently with the operations of FIG. 5B and such operations need not be discussed further here for an understanding of the subject invention.

Figure 5C:
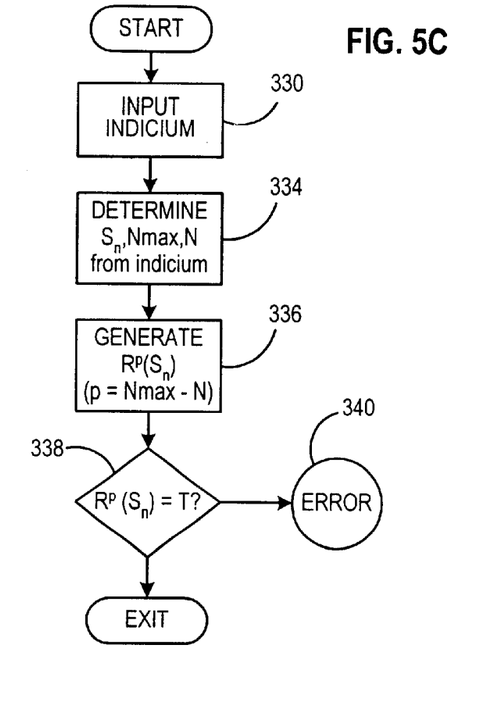

FIG. 5C shows the operation of verification facility 278. At 330 facility 278 inputs an indicium through conventional scanning equipment 280, and at 334 determines $S_n$, Nmax, and N from the indicium. In other embodiments data center 222 can provide Nmax to verification facility 278 in any convenient manner, for example by direct communication or by publishing a data base of values of Nmax for various metering systems. Provision through incorporation in the indicium is, however, preferred since in general verifier will receive messages for numerous originators and incorporation of Nmax will eliminate the need to access and maintain a data base of limits.

Then at 336, facility 278 uses cryptographic module 274 to compute $R_p(S_n)$; where p=Nmax−N, and, at 338, confirms that $R^p(S_n)=R^p(R^n(R^{-K}(T)))=T$. If this is not confirmed, i.e. if an intelligible plain text is not recovered, facility 278 enters an error routine at 340 and otherwise exits. Details of this routine form no part of the subject invention and need not be discussed further here. Where "T" is selected as described above, further confirmation is available by confirming that the "meter #" recovered from "T" agrees with the (normally included) meter number in the postal indicium and that Nmax and Nmin values recovered from "T" agree with the limits used.

(In the above description the similarity of iteration of function R and inverse $R^{-1}$ and multiplication of powers are self-evident. It is critical to note however the distinction that, as discussed above $R^{-1}$ can not easily be determined from R. Thus if m or n, for the message originator, or p or q, for the verifier, are less than zero the originator, or verifier, is unable to carry out the algorithms described above.)

Figure 6A:
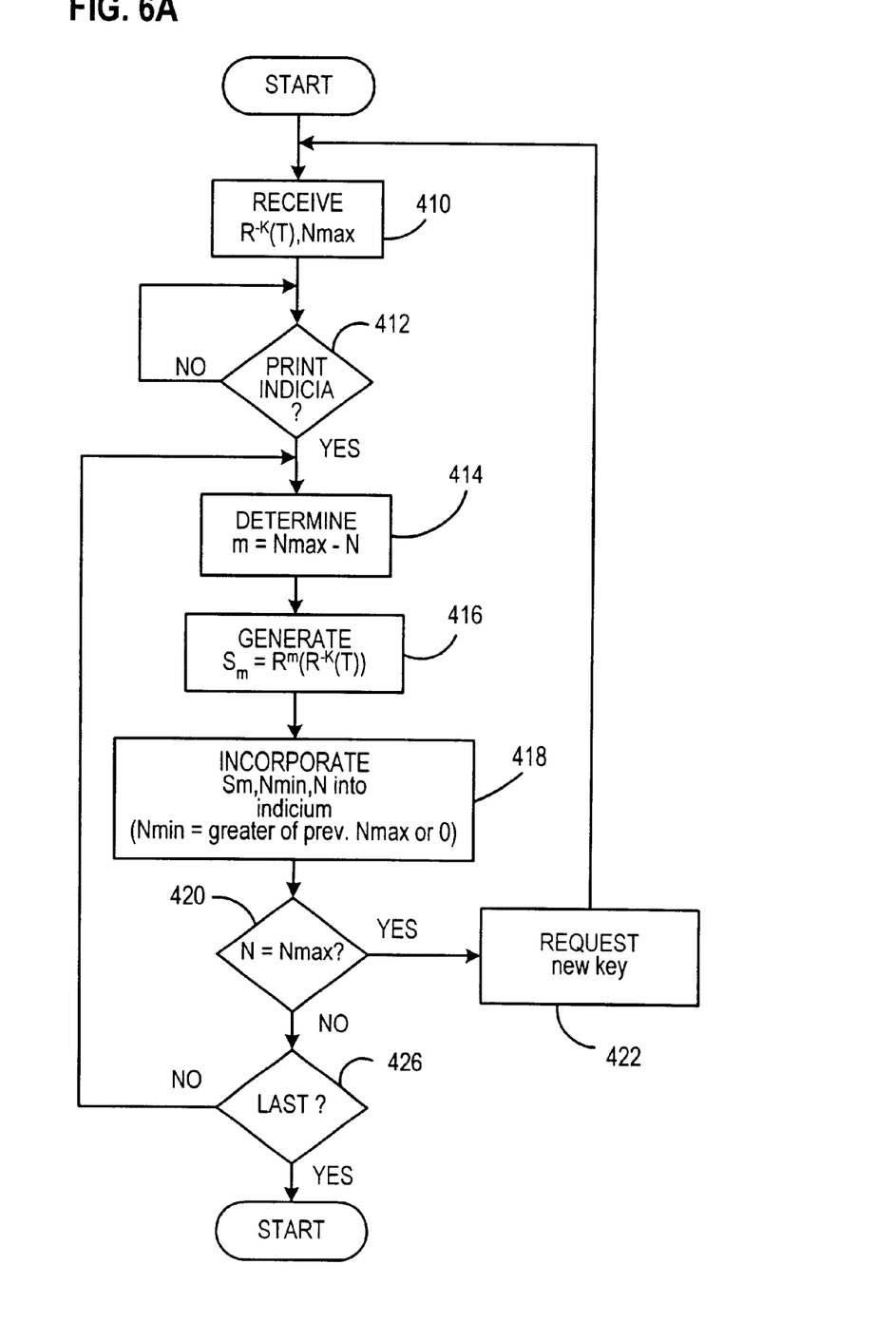
FIGS. 6A and B are flow charts of the operation, in accordance with another embodiment of the subject invention, of a postage metering system and a verifying station, respectively.
Figure 6B:
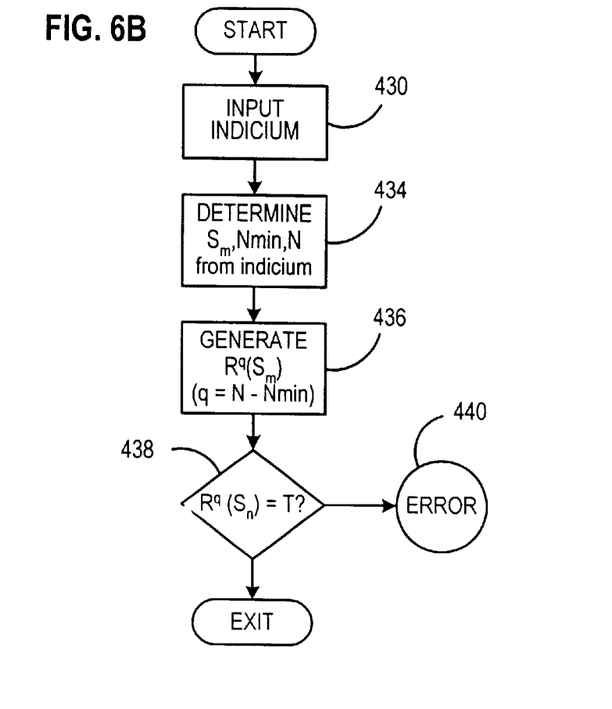

In the above embodiment, since function R need not be held in secret, it is possible for an attacker to generate verifiable messages for values N+D<Nmax from knowledge of message $S_n$ (n=N−Nmin) as $R_D(S_n)=S_{n'}$ (n'+N−D−Nmin). FIGS. 6A and 6B show another embodiment of the subject invention which overcomes this problem.

FIG. 6A shows the operation of a postage meter or other message originator in accordance with this embodiment and substantially corresponds to FIG. 5B, while FIG. 6B substantially corresponds to FIG. 5C and shows the operation of a verifier. Operation of the data center is unchanged.

In FIG. 6A, steps 410, 412, 420, 422, and 426 are substantially identical to the corresponding steps described above with regard to FIG. 5B. At 414 system 202 determines m, m=Nmax−N and, at 416, generates a third message $S_m=R^m(R^{-K}(T))$, and at 418 incorporates $S_m$, Nmin into the current indicium to be printed.

In FIG. 6B, steps 430, and 440 are substantially identical to the corresponding steps described above with regard to FIG. 5C. At 436 facility 278 uses cryptographic module 274 to compute $R^q(S_m)$; where q=N−Nmin, and, at 438, confirms that $R^q(S_m)=R^q(R^m(R^{-K}(T)))=T$. If this is not confirmed, i.e. if an intelligible plain text is not recovered, facility 278 enters an error routine at 440 and otherwise exits.

In this embodiment, an attacker can not print verifiable messages for values N+D from knowledge of $S_m$. An attacker can generate verifiable messages for values N−D>Nmin from knowledge of message $S_m$ (m=Nmax−N) as $R^D(S_m)=S_{m'}$ (m'=Nmax−(N−D)); however it is believed that in general, and particularly in postage metering applications, that is more critical to protect against fraudulent attempts to exceed upper limits. However it should be noted that in applications such as postage metering, where the variable N is monotonically increasing, successive values for $S_n$ can be generated as D iterations of R with the previous value as described above; greatly reducing the computational burden on the meter. Thus for particular such applications a tradeoff between security and computational efficiency will exist.

Expressed somewhat differently the two embodiments, or protocols described above can be considered as variations of a single protocol where the message originator generates $S_x$, where x equals the absolute value of the difference between N and one of said limits, and the verifier generates $R^y(S_x)$, where y equals the absolute value of the difference between N and the other of said limits.

It is a particular advantage of the subject invention, as is clear from the above descriptions, that even if an attacker obtains all of the secrets in the postage metering system 202, including R, any indicium that he attempts to fraudulently print without knowledge of $R^{-1}$ are detectable at the verification facility 278 if the indicium data, N, does not fall within the limits defined by Nmax and Nmin. Moreover, where N is a piece count, if the attacker tries to print extra indicium duplicate values of N, then there will be detectable duplicate piece counts. Additionally, N is an ascending register value, if the attacker tries to print extra indicium without exceeding the maximum ascending register value, Nmax, there will be overlapping ascending register values that can be detected at the verification facility 278. That is, the duplicate piece counts and the overlapping ascending register values are detectable if the verification facilities or a central data base maintain a record of all of the scanned indicium at all verification facilities.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, the following are some examples of such modifications:

While a preferred embodiment has been described in connection with a postage metering system, it can be implemented in any apparatus for generation of messages provided only that there is assurance that the asserted current value for the variable is correct; such as is inherently provided by a postage metering system.

The maximum piece count and the maximum ascending register values are representative examples of non-time parameter constraints that can be used to require a key change. Those possessing skill in the art will recognize the inventive concepts described herein can be used with other non-time constraint values as well.

What is claimed is:

1. A method for generating a first message and verifying that a variable used in the generation of said first message is between a predetermined upper limit and predetermined lower limit, said method comprising the steps of:

providing a trapdoor function R to a message originator and to a message verifier, said trapdoor function R having a corresponding inverse function $R^{-1}$ that is maintained in secrecy by a third party;

determining an integer K equal to the difference between said upper limit and said lower limit;

providing a second message including $R^{-K}(T)$ from said third party to said message originator, wherein T is a value within a range of said trapdoor function R;

generating, at said message originator, a third message $S_x=R^x(R^{-K}(T))$, wherein x is an integer equal to the absolute value of the difference between a current value of said variable and a first one of said upper limit and said lower limit;

incorporating at least said third message $S_x$ into said first messages;

receiving, at said message verifier, said first message, said message verifier recovering from said first message said third message $S_x$, said message verifier further determining said current value of said variable and a second one of said upper limit and said lower limit; and confirming that $R^y(S_x)=T$, wherein y is an integer equal to the absolute value of the difference between said current value of said variable and said second one of said upper limit and said lower limit.

2. A method as described in claim 1 wherein said first message is a postal indicium.

3. A method as described in claim 2 wherein said postal indicium is encrypted by a postage metering system using an encryption key and said second message is transmitted to said system when said key is changed.

4. A method as described in claim 3 wherein said value T includes an identification of said postage metering system.

5. A method as described in claim 1 wherein said value T further includes said second one of said upper limit and said lower limit.

6. A method as described in claim 1 wherein said function R is a public key encryption algorithm.

7. A method as described in claim 6 wherein said public key encryption algorithm is an RSA algorithm.

8. A method as described in claim 1 wherein said current value of said variable is provided to said message verifier within by said first message.

9. A method as described in claim 1 wherein said current value of said variable is inherent in the meaning of said first message.

10. A method as described in claim 1 wherein said current value of said variable is determined directly by said message verifier.

11. A method as described in claim 1 wherein said first message includes only said third message $S_x$.

12. A method as described in claim 1 wherein said first one of said upper limit and said lower limit is said lower limit.

13. A method as described in claim 12 wherein said first message is a postal indicium.

14. A method as described in claim 1 wherein said first one of said upper limit and said lower limit is said upper limit.

15. A method as described in claim 14 wherein said first message is a postal indicium.

16. A method as described in claim 1, wherein T is coded plain text.

17. A method as described in claim 16, wherein T is plain text coded as an integer.

18. A system for generating a first message and verifying that a variable used in the generation of said first message is between a predetermined upper limit and predetermined lower limit, said system comprising:

a data center having a trapdoor function R and a corresponding inverse function $R^{-1}$, said corresponding inverse function $R^{-1}$ being maintained in secret by said data center;

a message originating system; and a verification facility;

wherein said data center provides said trapdoor function R to said message originating system and to said verification facility, determines an integer K equal to the difference between said upper limit and said lower limit; and provides a second message including $R^{-K}(T)$ to said message originating system, wherein T is a value within a range of said trapdoor function R;

said message originating system generates a third message $S_x=R^x(R^{-K}(T))$, wherein x is an integer equal to the absolute value of the difference between a current value of said variable and a first one of said upper limit and said lower limit; said message originating system further incorporating at least said third message $S_x$ into said first message; and said verification facility receives said first message and recovers, from said first message, said third message $S_x$, said verification facility further determining said current value of said variable and a second one of said upper limit and said lower limit and confirming that $R^y(S_x)=T$, wherein y is an integer equal to the absolute value of the difference between said current value of said variable and said second one of said upper limit and said lower limit.

19. A system as described in claim 18 wherein said first message is a postal indicium.

20. A system as described in claim 19 wherein said postal indicium is encrypted by a postage metering system using an encryption key and said second message is transmitted to said postage metering system when said key is changed.

21. A system as described in claim 20 wherein said value T includes an identification of said postage metering system.

22. A system as described in claim 18 wherein said value T further includes said second one of said upper limit and said lower limit.

23. A system as described in claim 18 wherein said function R is a public key encryption algorithm.

24. A system as described in claim 23 wherein said public key encryption algorithm is an RSA algorithm.

25. A system as described in claim 18 wherein said current value of said variable is provided to said verification facility within said first message.

26. A system as described in claim 18 wherein said current value of said variable is inherent in the meaning of said first message.

27. A system as described in claim 18 wherein said current value of said variable is determined directly by said verification facility.

28. A system as described in claim 18 wherein said first message includes only said third message $S_x$.

29. A system as described in claim 18 wherein said first one of said upper limit and said lower limit is said lower limit.

30. A system as described in claim 29 wherein said first message is a postal indicium.

31. A system as described in claim 15 wherein said first one of said upper limit and said lower limit is said upper limit.

32. A system as described in claim 31 wherein said first message is a postal indicium.

33. A system as described in claim 18, wherein T is coded plain text.

34. A system as described in claim 33, wherein T is plain text coded as an integer.

\* \* \* \* \*

UNITED STATES PATENT AND TRADEMARK OFFICE
CERTIFICATE OF CORRECTION

PATENT NO. : 6,711,680 B1
DATED : March 23, 2004
INVENTOR(S) : Cordery

It is certified that error appears in the above-identified patent and that said Letters Patent is hereby corrected as shown below:

<u>Title page</u>,
Item [54], Title, should read:
-- METHOD AND SYSTEM FOR GENERATING MESSAGES INCLUDING A VERIFIABLE ASSERTION THAT A VARIABLE IS WITHIN PREDETERMINED LIMITS --

Signed and Sealed this

Twenty-fifth Day of May, 2004

JON W. DUDAS
*Acting Director of the United States Patent and Trademark Office*